United States Patent [19]

Tendler

[11] Patent Number: 4,621,348

[45] Date of Patent: * Nov. 4, 1986

[54] TALKING DEPTH SOUNDER

[76] Inventor: Robert K. Tendler, 19 Lawrence Ave., Chestnut Hill, Mass. 02167

[*] Notice: The portion of the term of this patent subsequent to Dec. 18, 2001 has been disclaimed.

[21] Appl. No.: 608,465

[22] Filed: May 9, 1984

Related U.S. Application Data

[63] Continuation-in-part of Ser. No. 412,939, Aug. 30, 1982, Pat. No. 4,489,405.

[51] Int. Cl.4 ................................................ G01S 7/56
[52] U.S. Cl. .................................... 367/116; 367/108; 367/109
[58] Field of Search ............... 367/109, 111, 116, 112, 367/108

[56] References Cited

U.S. PATENT DOCUMENTS 4,013,991 3/1977 Balcom .............................. 367/109
4,234,941 11/1980 Welland, Jr. et al. .............. 367/116
4,489,405 12/1984 Tendler .............................. 367/116

FOREIGN PATENT DOCUMENTS 1318081 5/1973 United Kingdom .

Primary Examiner—Thomas H. Tarcza
Assistant Examiner—Daniel T. Pihulis

[57] ABSTRACT

Apparatus is provided for adapting an analog depth sounder for the calling out of the depth at regular time intervals. In one embodiment, a self-contained adapter module is mounted to the face of the depth sounder so as to cover the depth sounder display, with the module including a transparent plate carrying a detector array and with electronics and speaker carried at the center of the array. In this embodiment, the detectors are arranged in thin radially extending lines to permit accommodation to displays of different diameter. Alternatively, small detectors are arranged along a circle having a diameter which overlies at least a portion of the orbiting radiating element which radiates along a considerable length. This alternative array configuration also accommodates a range of display diameters. As a further alternative, to accommodate different diameter displays, the thin line detectors may be replaced with radially extending light pipes withdetectors at their ends. The transparent plate with almost invisible detection apparatus permits viewing of the depth sounder display through the plate so thatvisual as well as audible readout may be achieved. Electronics is provided to decode the angular position of the orbiting element of the depth sounder at the time the element is actuated to provide a digital number representing depth. This number is then used in generating its speech equivalent through a standard speech synthesizer and loudspeaker. The electronics may include a number of different ROMS or different sections of a single ROM to provide for scale adjustment. Alternatively, a variable rate clock may be used to adjust for scale. Alternative embodiments include sensing the time difference between pulses of electromagnetic radiation from the depth sounder to establish depth, with the signals being available outside the depth sounder case. In each embodiment, signals which activate the speech synthesizer may be used to drive a digital display for improved filtering against spurious signals.

6 Claims, 11 Drawing Figures

TALKING DEPTH SOUNDER

This application is a continuation-in-part of prior application Ser. No. 412,939, filed Aug. 30. 1982, now U.S. Pat. No. 4,489,405.

FIELD OF THE INVENTION

This invention relates to depth sounders and more particularly to a method and apparatus for adapting conventional analog depth sounder which displays depth in terms of the presence of electromagnetic energy at a given angle on the display to give an audible indication of depth.

BACKGROUND OF THE INVENTION

There exist a number of analog depth sounders which provide a display of depth in terms of the angular position of a lighted neon bulb with respect to a zero, usually at the top of the display. These depth sounders in general incorporate a neon bulb mounted on a rotary disk in which the neon bulb is actuated by the return of sonar signals which have been projected into the water and which are reflected either by the bottom of the ocean or by fish. The disk is driven by a synchronous motor which is timed in accordance with the transmission of the signals from the transducer used with the depth sounder such that the angular position of the actuated neon bulb corresponds to the depth immediately underneath the vessel utilizing the depth sounder. A circumferential scale is conventionally provided on the display to relate angle to sensed depth. As is conventional, the depth sounder is provided with an intensity control and the operator reduces the intensity of the neon bulb to the point at which only two lines are visable, namely the zero line and the first depth line. It will be appreciated that multiple lines can be viewed on the depth sounder display when multiple bounces of the sonar signal occur. By adjustment of the intensity level, it is possible to adjust the depth sounder such that only one unambiguous indication of depth is displayed.

While these depth sounders are indeed a great aid to navigation, especially in narrow channels, it is oftentimes inconvenient to glance at the display while trying to navigate in a crowded channel. It will be appreciated that glancing at the depth sounder to readout the depth is not only inconvenient, but also can result in accidents due to glancing away from the scene.

It is therefore desirable that an audible indication of depth be provided so that the operator of the vessel need not divert his attention from the situation at hand.

Moreover, since depth sounders are frequently used in navigation, it is likewise desirable to provide an audible depth indication for the vessel's navigator whose attention is drawn away from the chart he is using when he must look up at the depth sounder in order to ascertain the depth of the water over which the vessel is currently passing.

SUMMARY OF THE INVENTION

In the subject invention a simple system is provided for adapting an analog depth sounder such that an audible indication of depth is provided on a regular basis, while at the same time permitting the depth sounder to provide the normal visual display of depth. In one embodiment the adaptation is achieved by the placing of a transparent plate over the face or bezel of the depth sounder in which the transparent plate is provided with a radially running array of photodetectors. The photodetector array is arranged over the bezel such that a zero photodetector is located radially at the same angle as the zero noted on the bezel of the depth sounder. The array is made of narrow elements or to permit viewing of the depth sounder display through the plate and around the array. Since the photodetectors are arranged radially, the plate can accommodate various sizes of depth sounder displays or bezels since it is only necessary to detect the angular displacement of the neon bulb normally utilized.

In an alternative embodiment, the radial array of photodetectors may be replaced with a radial array of light pipes with photodetectors at the ends of the light pipes. In one embodiment the light pipes may be formed by radially running score lines in the transparent plate. This configuration contributes to the transparency of the array because the score lines can be made exceedingly thin. Thus, very little of the neon bulb is obscured by the optical pick-off portion of the system.

In another embodiment, the photodetectors may be arranged about the circumference of the display looking inwardly to detect the radiation from the end of the neon bulb. In this embodiment, the detector array does not occlude the display at all so that normal visual readout is readily achieved.

In a still further embodiment which does not require light pipes, with small detectors they may be mounted in a ring having a diameter which would overlie at least some portion of the neon bulb. Since the bulb emits radiation over its considerable length, such an array can accommodate different size displays, assuming the detector will overlie at least a portion of the bulb. Since the detectors are small, the display can still be read through the array.

The transparency of the adaptation plate and the virtual transparency of the array permits adjustment of the intensity control for the depth sounder such that only one unambiguous indication of depth is achieved. Thus, the subject adaptation pemits not only the audible indication of depth, but also does not impede visual readout of the depth sounder by an individual.

In one embodiment the output of the detector array is coupled to electronics and a speaker housed in a unit which is mounted on top of the conventional depth sounder, whereas in an alternative embodiment, the electronics and speaker are housed at the center of the array, with electrical power being applied, in one embodiment, but batteries contained within the housing. In this embodiment, no electrical connections need be made either to the depth sounder or the ship's power supply. It is therefore an exceedingly simple matter to adapt the conventional depth sounder by merely placing a completely self-contained unit directly over the depth sounder display and turning it on.

The electronics for reading out the array includes an array of threshold detectors, the outputs of which are lead to an angle decoder and depth code generator. It is the purpose of the angle decoder and depth code generator to sense which of the photodetectors is providing an output signal and to generate a corresponding depth code, e.g. a number equalling the sensed depth. The depth code is made compatible with the input code requirements for a standard speech synthesizer chip such as National Semiconductor Model DT1050. It is the function of the synthesizer chip to generate an audio signal coupled to a loudspeaker, which signal is the speech equivalent to the depth. The synthesizer operates to generate the audio signal corresponding to the input code which exists at its input at the time a start signal is applied to the synthesizer.

In a preferred embodiment, timing is provided to generate a start signal for the synthesizer unit such that an audible readout is achieved on a periodic basis. The timing unit provides a reset pulse to the angle decoder and depth decode generator either before or after readout as desired.

It will be appreciated that there need be no synchronization between the angle decoder and depth code generator and the depth sounder, simply because it is not critical to readout the depth at any particular instant of time with respect to the actuation of the depth sounder.

However, in order to achieve multiplexing it may be desirable to provide a timing signal from the depth sounder display, and this is simply accomplished by detecting the onset of the flash from the neon bulb at the zero position of the depth sounder. In this manner, the angle decoder and depth code generator can be synchronized with the depth sounder operation. This synchronization can also be established for the timing unit utilized to actuate the synthesizer.

Scale adjustment for the adaptation unit may be achieved through the utilization of a number of different read-only memories (ROMS) or the utilization of different sections of one ROM. Thus, the scale may be set by actuating a preselected ROM corresponding to, for instance, depth ranges of zero to fifty feet, zero to sixty feet, zero to one hundred feet, zero to one hundred and twenty feet, etcetera.

In one embodiment, the output of the detector array may be decoded utilizing a coincidence detector which is utilized to freeze a register which is clocked at a rate which corresponds to the periodicity of the depth sounder display. This register is reset by a decoded signal corresponding to the flash at the zero position of the depth sounder such that the register is incremented by the clock until such time as an output from the coincidence detector freezes the register. Note that a variable rate clock may be utilized to set the range of the adapter module to the range of the depth sounder. In operation, the register having been reset at zero, is clocked at a predetermined rate until such time as a flash is detected. This freezes the register. When frozen, the register output corresponds to the detector number, the angular position of the actuated neon bulb, and thus the sensed depth. The output of the frozen register may then be decoded and provided to the aforementioned synthesizer. The synthesizer may be actuated by a counted-down signal from the clock such that the output of the analog depth sounder is converted on a periodic basis to the speech equivalent of depth.

It will be appreciated that the neon bulb normally used generates electromagnetic radiation not only in the visible region of the electromagnetic spectrum, but also at a wide variety of frequencies. Thus, the signal produced by the neon bulb actuation may be detected, for instance, by a capacitor array rather than a photodetector array. Since the signal utilized to actuate the neon bulb is electromagnetic in nature, an array of magnetic detectors may be substituted for the photodetectors. As such, this invention relates to the detection of any electromagnetic radiation at an angle corresponding to depth.

As an alternative, any electromagnetic radiation produced by the depth sounder in sending out or processing received signals, which radiation is detectable without hardwired access to the interior of the depth sounder, is used to detect depth by the time difference between transmission and receipt of sonar signals. In one of these alternative embodiments, two detectors are used, one to detect electromagnetic radiation representing a zero flash position, whereas the other detector detects electromagnetic radiation associated with all flashes. In another of these embodiments, thresholding distinguishes between electromagnetic radiation representing a zero flash position and other flashes.

In each embodiment, signals used to drive the speech synthesizer may be used to drive a digital display. Because the digital display is actuated from the flashes as opposed to unfiltered electronic signals in the depth sounder, the digital readout is extremely stable and accurate. This is because the depth sounder is visually adjusted to provide two and only two flashes. Thus, the optical link serves a filter function for removal of spurious signals.

In summary, a method and apparatus are provided for adapting a depth sounder having an analog display to a talking depth sounder. The display is one having at least one element which generates electromagnetic radiation at an angular position corresponding to depth. In one embodiment, the adaptation takes place by locating a plate having an array of electromagnetic radiation detectors thereon over the depth sounder display, with the array being arranged to sense the angular position at which the elctromagnetic radiation is generated. Means are then provided for converting the sensed position of the electromagnetic radiation into the speech equivalent of a number corresponding to the depth represented by the angular position of the sensed radiation. For convenience, the plate may be made transparent or alternatively, the array may be situated so as not to completely block the display. In an alternative embodiment, the time difference between pulses of flash actuation radiation available outside the depth sounder case is used to convert depth to the speech or digital equivalent.

BRIEF DESCRIPTION OF THE DRAWINGS

These and other features of the subject invention will be better understood in connection with the detailed description taken in conjunction with the drawings of which.

DETAILED DESCRIPTION

Figure 1:
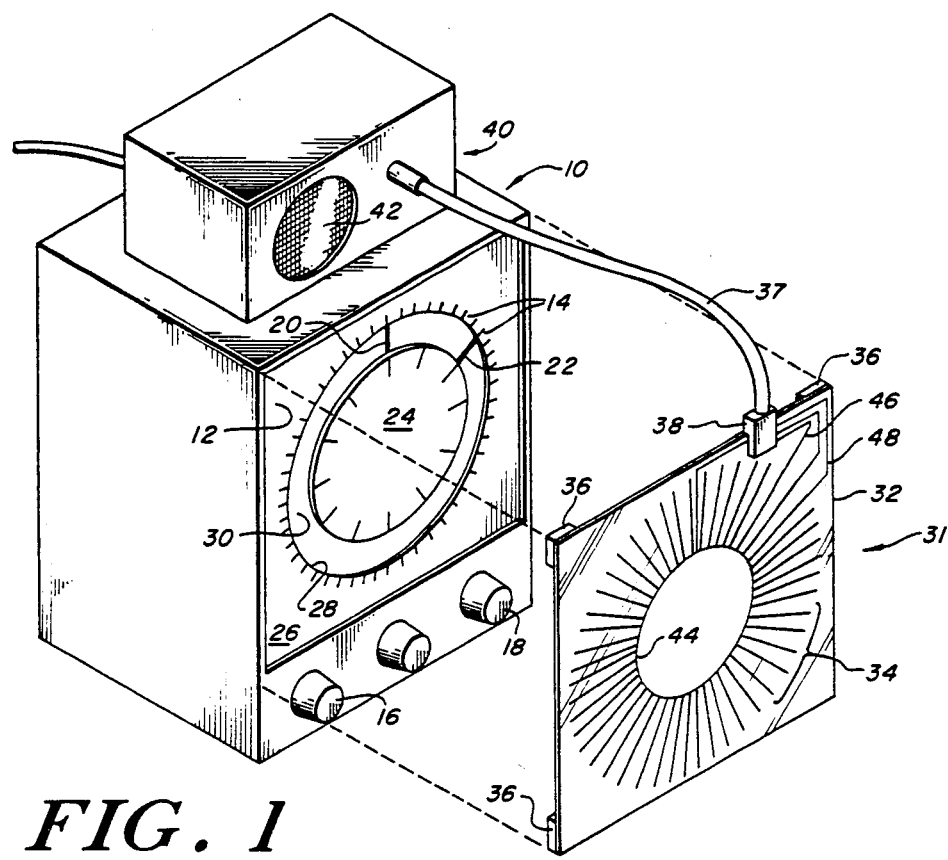
FIG. 1 is a diagrammatic and exploded view of the subject adaptation module for utilization with a conventional analog depth sounder.

In order to provide a conventional depth sounder with the ability to announce depth to the operator of a vessel through the calling out of a number corresponding to depth and referring now to FIG. 1, a conventional depth sounder 10 includes a face or bezel 12 which has markings 14 corresponding to a depth scale set by a scale adjustment switch 16. Upon proper adjustment of an intensity control 18, two flashes 20 and 22 will occur at the face of the device between an inner circular plate 24 and an outer plate 26 having an aperture 28 therethrough. The aperture is circular and with the inner disk forms a channel 30 through which the neon bulb providing flashes 20 and 22 is exposed.

As is conventional in depth sounders of the analog type, intensity control 18 may be adjusted so as to provide only a single flash 22, thereby eliminating multiple representations of depth caused by double bounce or triple bounce situations.

As such, disk 24, plate 26, circumferential channel 30, and indications of electromagnetic energy such as provided by the rotating neon bulb, provide for an analog display of the depth of the water beneath the vessel by virtue of the angular displacement of the indication 22 from the indication 20 which corresponds to zero depth and a zero for the system.

In general, a single neon bulb is mounted on a rotatable disk beneath the aforementioed display and is mounted to a synchronous motor (not shown) which synchronizes the actuation of the display with the transmitted and received sonar pulses.

In order to adapt a standard depth sounder of the analog type to provide for the call-out of depth at regular intervals, hereinafter referred to as "a talking depth sounder", an adapter module 31 includes a transparent plate 32 which is provided with a detector array 34 extending radially at predetermined angles so as to provide, for instance, a resolution of 7.2° corresponding to one foot increments on a scale of 0–50 feet. This transparent plate and array is attached over the display, in one embodiment, by pads 36 having double sticky-back tape with a removable cover sheet. Array 34 is attached by cable 37 via connector 38 to an electronics and speaker unit 40 which is coupled to the same power supply as the depth sounder. Unit 40 has a speaker 42 from which an audible call of the depth periodically eminates.

In one embodiment, array 34 includes a number of individual thin lineal photodetectors having a common inner contact 44 and individual outer contacts 46 and 48 coupled to connector 38. Fifty individual photodetectors yield a one foot depth resolution for depth sounders having a scale of zero to fifty. Correspondingly, sixty photodetectors give a one foot depth resolution for depth sounders having a zero to sixty scale. Of course, half the number of photodetectors may be utilized for half the resolution.

Figure 2:
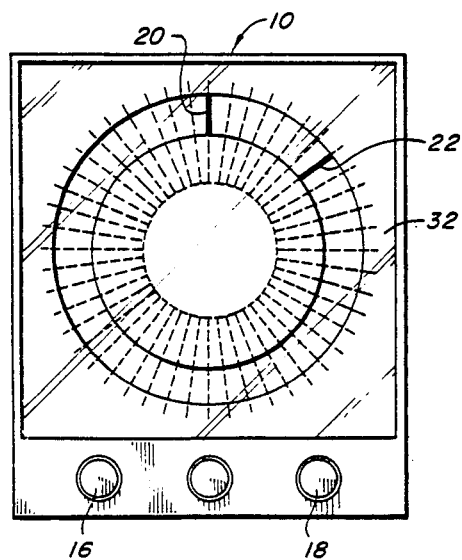
FIG. 2 is a front view of a conventional analog depth sounder illustrating the positioning of a transparent plate carrying a radially extending array of detectors, illustrating the ability to view the depth sounder display through the adaptation module.
Figure 3:
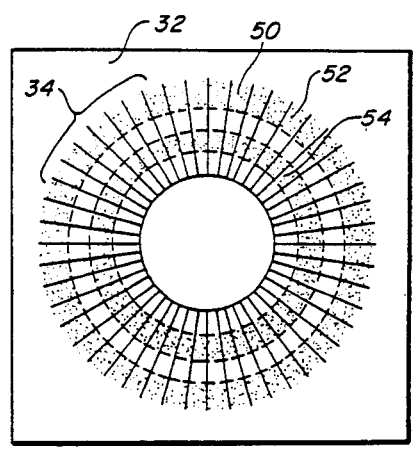
FIG. 3 is a diagrammatic illustration of ability of the subject adaptation plate to accommodate different diameter depth sounder displays.

Referring now to FIG. 2, unit 10 with plate 32 in place, indicates that because the plate is transparent and because the photodetectors may be made so thin that they can be seen around, indications 20 and 22 are readily visible through the adapter module. This has the advantage of being able to view the display in the normal manner, whereas an audible readout of depth is readily obtained. Moreover as illustrated in FIG. 3, plate 32 with radial array 34 thereon, is adaptable to displays of varying diameter. For instance, as illustrated at 50, a neon bulb orbited around in the arc illustrated will lie adjacent section 52 of array 34. A smaller display in which the neon bulb travels around in the arc designated by reference character 54, may also be accommodated by the above adaptation technique simply because of the recognition that the angular displacement of depth is the same regardless of the diameter of the display. Thus the subject adaptation module and technique may be utilized with analog depth sounder displays having a wide variety of different diameters.

Figure 4:
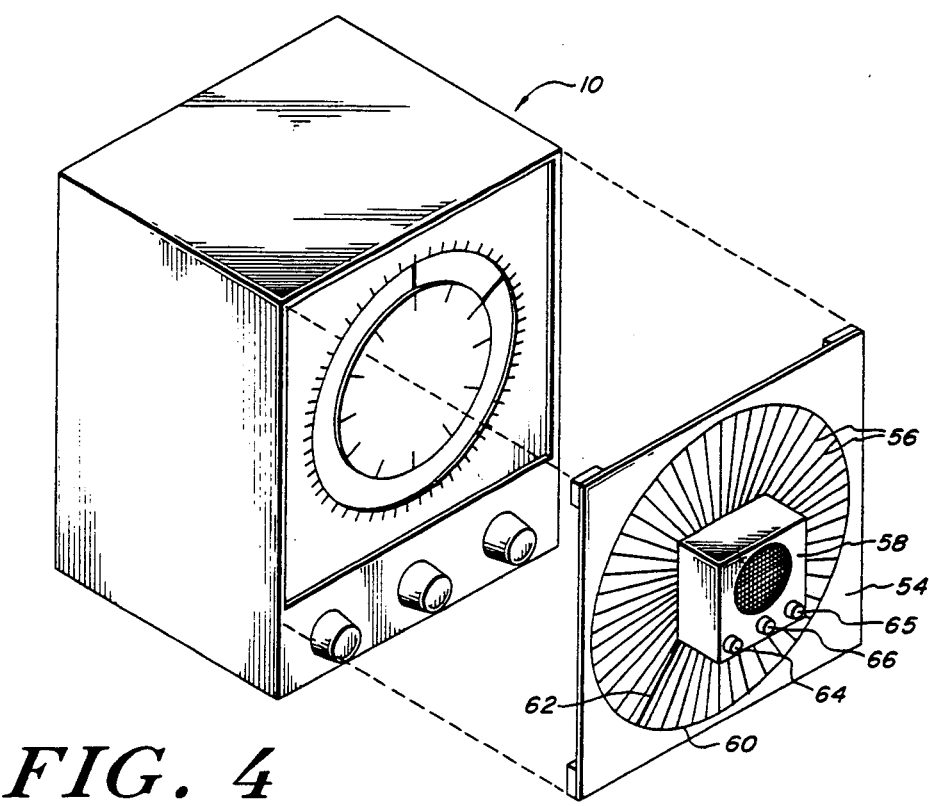
FIG. 4 is a diagrammatic illustration and exploded view of the subject adaptation module illustrating a self-contained unit in which the housing for the electronics and speaker are located at the center of the array on the plate.

Referring now to FIG. 4, in a further embodiment the adapter module includes a plate 54 having an array of photodetectors 56 thereon, with electronics and speaker for the adapter module being located centrally as illustrated at 58. The advantage to this unit is that it is totally self-contained in that housing 58 can contain the batteries for powering the electronics. Moreover, it will be appreciated that the outer ends of the individual detectors of array are joined at the periphery as illustrated at 60 and connected to the electronics via line 62. Conveniently, the inner ends of the detectors may be connected directly to the electronics in circuit board fashion, thereby minimizing the number of leads which need be patterned onto the plate. Unit 58 is provided with an on/off volume control 64, a scale control 66, and a threshold setting control 68, the purpose of which will be described hereinafter.

Figure 5:
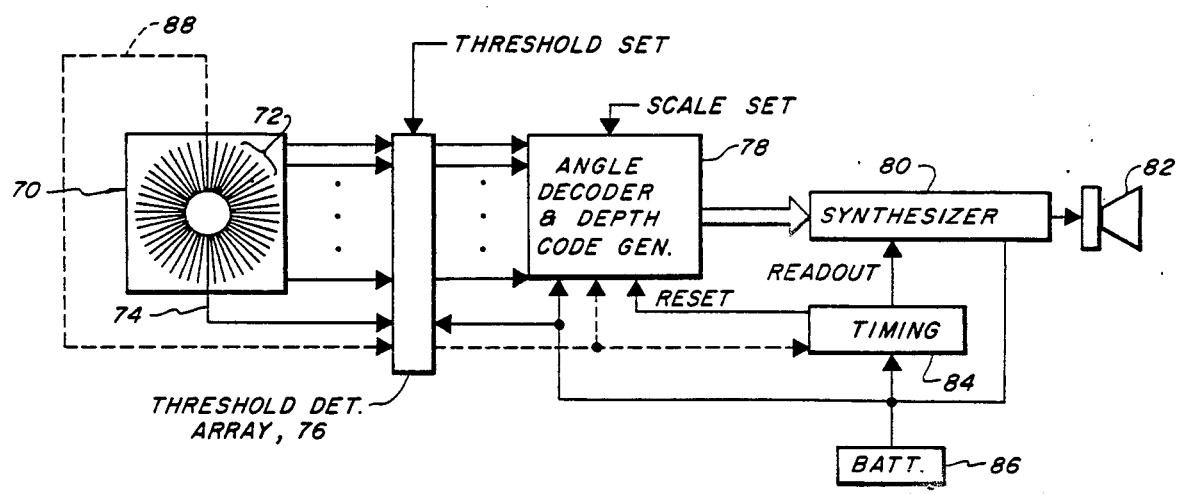
FIG. 5 is a schematic diagram of one embodiment of the electronics utilized to decode the array of FIGS. 1-4.

Referring now to FIG. 5, a plate 70 includes an array 72, with the inner ends being interconnected and connected via line 74 to one terminal of a threshold detector array 76 composed of individual conventional threshold detectors which are setable either individually or in gang fashion.

The other ends of the individual detectors in the array are coupled to the threshold detector array 76 such that each of the lines corresponding to a different one of the photodetectors is coupled to a different threshold detector within the threshold detector array. Thus, the number of lines to the threshold detector array is identical to the number of detectors in the array. The output of the threshold detector array is coupled to an angle decoder and depth code generator 78 which decodes on which of the lines from the threshold detector array a signal appears. This corresponds to the detection of an actuated neon bulb at a give angular position. The angle decoder portion of unit 78 determines which of the detectors in the array is generating an output and converts this number to a depth code which is supplied to a synthesizer 80 which converts the code into an audible representation of the depth. One such synthesizer is National Semiconductor Model DT1050.

When a code is presented to this synthesizer and a start pulse is provided, the unit generates an English language number corresponding to the input code. The output of unit 80 is coupled to a suitable loudspeaker 82 for the anunciation of depth. It will be appreciated that the synthesizer is provided with a timing unit 84 which reads out unit 80 at selected time intervals. Power for the unit is supplied by a battery 86 contained within the unit. As will be appreciated, an actuation signal may be provided by timing unit 84 to readout the synthesizer to the loudspeaker. Timing unit 84 also provides a reset signal to unit 78 to reset this unit either before or after readout of synthesizer 80.

Should it be desirable, the angle decoder and depth generator unit may be provided with a synchronization signal from the display of the depth sounder as indicated by dotted arrow 88, which runs from the zero position of the display to the threshold detector array 76. Threshold detector array 76 provides a signal at the beginning of the zero flash of the display as detected by the zero photodetector which signal is utilized either in unit 78 or timing unit 84 to synchronize the operation of these units with the operation of the depth sounder.

It will however be appreciated that such timing is unnecessary since the subject adapter module merely converts angular position of the flash to an audible representation of the depth represented by the flash. Timing is therefore not particularly critical unless mulitplexing is desirable.

For instance, timing unit 84 may actuate the synthesizer once every five seconds, with the synthesizer reading out the output of unit 78 at five second intervals. Since the glow of the neon bulb is relatively persistent, a relatively constant output is provided which can be detected by the threshold detector and decoded by unit 78.

Figure 6:
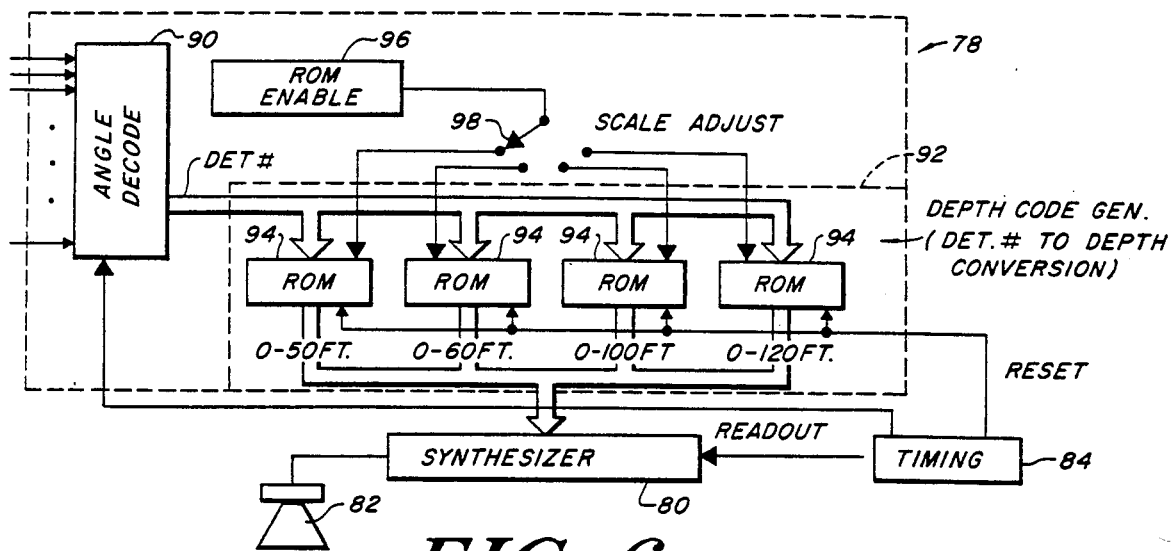
FIG. 6 is a schematic diagram of the angle decoder and depth code generator for use in the circuit of FIG. 5.

Referring to FIG. 6, in one embodiment angle decoder and depth code generator 78 includes an angle decoding unit 90, the output of which is a detector number corresponding to the detector which is providing an output due to the actuation of a neon bulb at the angular position immediately therebeneath. One embodiment of angle decode unit 90 will be described in connection with FIG. 7. In another embodiment, the angle decode unit includes suitable sample and hold circuits and logic which recognize the presence of signals from predetermined threshold detectors and generate predetermined codes responsive thereto. These codes identify the illuminated detector and are provided to the depth code generator for the generator of a synthesizer-compatible code. Timing for the angle decoder may be provided by timing unit 84. Note that angle decoder 90 may be configured to maintain its output until such time as there is a change of input. As to the depth code generator portion of unit 78 encircled in dotted box 92, in one embodiment this generator includes a series of read-only memories (ROMS) 94 which convert the detector number to a code compatible with synthesizer 80. Each ROM or section of ROM may be actuated by a ROM enable unit 96 through a scale set switch 98 to actuate the particular ROM or section of ROM corresponding to the range to which the depth sounder is set.

It is the function of the ROM to provide a lookup table for converting the detector number to a digital code representing the depth to be called out. For instance, if the depth is 8 feet, the digitial code 00001000 would be readout to Model DT1050. Nine feet, on the other hand, would result in a code of 00001001 being readout from the ROM. In fact in the above model synthesizer, codes of 1 to 20 proceed in the usual binary fashion.

It is the purpose of timing unit 84 to provide a reset pulse to each of the ROMs immediately either before or after a readout pulse is delivered to synthesizer 80.

In operation, angle decoder 90 provides a number at its output corresponding to the illuminated detector. This number is maintained and does not change unless a different detector is illuminated. Thus, there is a constant detector number to be converted periodically by generator 92. Generator 92 is periodically reset, preferably just before readout of the synthesizer 80, so that updated information is read into the synthesizer. As will be seen, timing is not critical and there is no necessary synchronization with the depth sounder.

Figure 7:
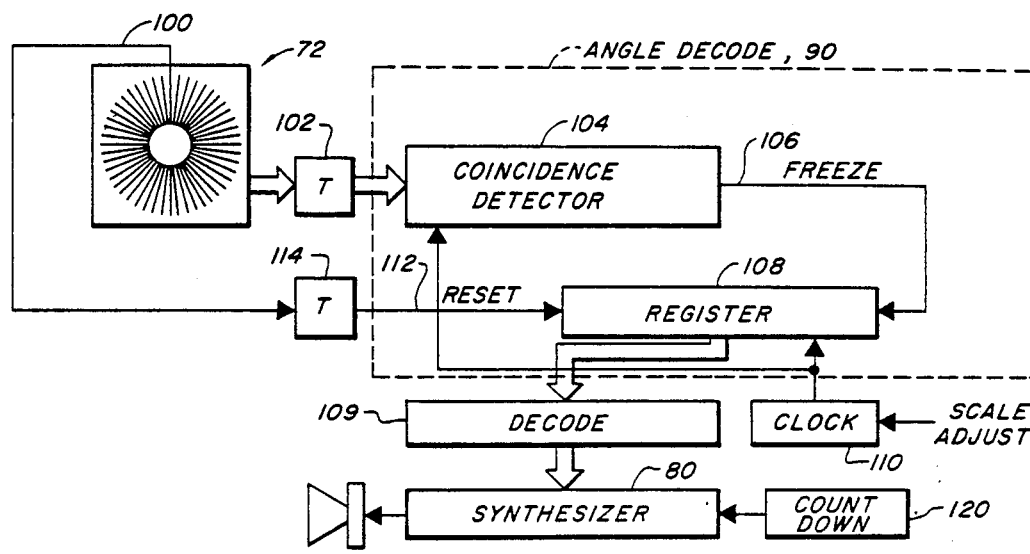
FIG. 7 is a schematic diagram of another type of angle decoder and depth code generator for use in the circuit of FIG. 5.

Referring now to FIG. 7, angle decoding may be accomplished on a synchronous basis such that a certain amount of multiplexing may be achieved through the timing provided over line 100 from array 72. In FIG. 7, the output of the array is provided to a threshold detector 102, which is then coupled to a coincidence detector 104 which provides a freeze pulse over line 106 at any time that an individual detector of the array has an output associated therewith. The output of the freeze pulse is applied to a register 108 which is clocked by a clock 110. Register 108 is reset via a signal delivered over line 112, which is generated by a threshold detector 114 coupled to the zero photodetector element of array 72. The output of register 108 is decoded at 92, the output of which is applied to synthesizer 80.

Clock 110 is a variable rate clock which may be adjusted to the scale of the depth sounder. Synthesizer 80 is actuated by a counted-down signal from clock 110 provided by count down unit 120.

In operation, when the neon bulb reaches the zero angle, the output from this detector is detected at 114 which resets register 108. Thereafter, during the cycle of the depth sounder in which the bulb rotates 360° back to its original position, register 108 is clocked at a predetermined rate. If, during this cycle any one of the individual detectors of the detector array provides an output signal, it is detected by coincidence detector 104, which freezes register 108 at the particular number it has been counted up to. This number corresponds to the angle at which the flash from the neon bulb occurred, which in turn corresponds to a predetermined depth. The frozen register is readout to a decode unit 109 which converts the register count to a number code acceptable to synthesizer 80. Alternatively, if the output of the register is a binary number representing the register count, the register can be directly read into the synthesizer. It will be appreciated that angle decode unit 90 recycles once every revolution of the disk carrying the neon bulb, the decoded output of register 108 being utilized to actuate synthesizer 80 in timed relationship to the synchronization provided by the display.

Clock 110 is a variable rate clock which may be adjusted conventionally such that the number called out matches the depth which can be visually ascertained by looking at the display. In other words, clock 110 frequency may be adjusted until the announced depth matches that which is readable on the display. Thus, there need be no pretuning of the clock to the particular depth sounder. Note also that in this embodiment, multiple ROMs need not be used for scale adjustment.

What has therefore been provided is an adapter module which adapts any analog depth sounder to be a talking device in which depth is called out on a regular periodic basis. Synchronization need not be provided, or if it is provided, is provided very simply without access to the interior of the depth sounder or its electronics.

In operation, the adapter and module may merely be pasted over the face of the depth sounder, turned on, and simply adjusted by first adjusting the intensity knob of the depth sounder to provide only one non-zero indication of depth. Thereafter, the scale of the adapter module is either set or experimentally found. Depending on the neon bulb utilized, the threshold circuits may be set in gang fashion or adjusted individually. Moreover, adaptive thresholding may be provided to adapt for ambient light conditions.

Figure 8:
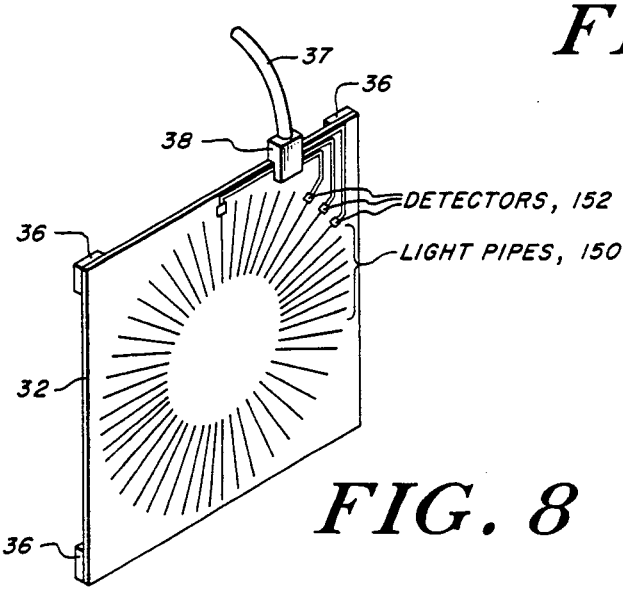
FIG. 8 is a diagrammatic representation of an array using radially running light pipes with photodetectors at the ends of the light pipes.

Referring now to FIG. 8, in order to reduce the expense in the manufacture of the detector array, it is possible to provide transparent plate 32 with radially extending light pipes, with the light pipes lead to an array of detectors. It is the purpose of this embodiment to limit the size of the detectors and therefore the overall cost of the configuration. As illustrated in FIG. 8, light pipes 150 run radially as did the photodetectors in the previous embodiments. Detectors 152 are mounted at one end or the other of the corresponding light pipes, with the outputs of the detectors being coupled via connector 38 and cable 37 to the appropriate processing circuitry. As such, the light pipes and the detectors form the array.

One way of forming light pipes in an inexpensive manner is to score the transparent plate or etch it in such a fashion that light occurring along a given radial line is transmitted from the point of intercept to the end of the line via the columnation provided by the light pipe structure. Since detectors can be mounted at the periphery of the display either linearly or along a circumference, the spacing between the detectors is not particularly critical. Additionally, extremely small photodetectors may be utilized due to the rather large magnitude signal provided by the neon bulb. As illustrated, the detectors are located around the circumference of the array. Alternatively, because the detectors may be made exceedingly small, they may be mounted at the interior ends of the light pipes from whence the outputs may be connected directly to a printed circuit board carried at the center of plate 32.

It will be appreciated that the utilization of scribe lines for light pipes or light pipes themselves permits the viewing of the depth sounder display through the transparent plate. Moreover, the scribe lines can be made exceedingly thin, both improving resolution and decreasing cross-talk between light pipes. Alternatively, light pipes or other light channeling structures can be formed either on or in the transparent plate with suitable cladding or coatings to prevent cross-talk. Note that by suitable slanted end-slice configurations, light from the neon bulb can be made to enter the light from a range of positions along the length of the pipe. Alternatively, the light pipe can be flattened on the underneath side to admit light. Additionally, it will be appreciated that the detectors may be coated with a red transmissive material to eliminate the effects of sunlight impinging on the module.

Since the detectors can be made exceedingly small, they would not block much light from the neon bulb, and since the bulb emits radiation over a considerable length, light pipes need not be used. Rather, as illustrated, a detector 154 may be mounted along a radius 156 at a point midway along bulb envelope 158. The locus of the detectors defines a circle 160 which overlies at least a portion of the bulb for a range of display diameters. The result is that a ring of detectors at a given distance from the center of the display would accommodate different diameter displays assuming at least a portion of the bulb underlies the detector.

If desirable, for all embodiments adaptive thresholding circuitry may be provided to adjust the thresholds of the threshold detectors coupled to the outputs of the detectors so that the depth sounder may be utilized in bright sunlight.

While in the aforementioed embodiments the angular position of the flashes of an analog depth sounder are ascertained, the analog depth sounder also produces radiation which triggers the neon bulb utilizied in giving the analog indication of depth, which radiation is available outside the case of the depth sounder. The electromagnetic radiation responsible for the zero flash indicates the time at which the sonar signal is first initiated, and the electromagnetic radiation utilized in generating the second flash establishes the time at which the reflected sonar signal returns. By utilizing a receiver which detects such electromagnetic radiation outside the case of the depth sounder, no access need be had to the interior of the depth sounder. At the same time, this radiation establishes a time difference which corresponds to depth. In one embodiment, the electromagnetic radiation sensed is the 200 KHz signal which is utilized in driving the sonar transducer, whereas in another embodiment, either the high GHz radiation resulting from firing the flashlamp or the flashlamp emission itself is utilized to develop the required timing signals which are then converted into depth and subsequently into the speech equivalent by a speech synthesizer.

One of the difficulties in establishing depth by this method is establishing the identity of the electromagnetic radiation representing zero depth as opposed to the electromagnetic radiation representing the return sonar signal. As will be described in connection with FIGS. 9 and 10, the electromagnetic radiation representing the zero flash is established by a photodetector placed at the zero position on the face or bezel of the depth sounder. This photodetector detects only the zero position flash. Electromagnetic radiation representing the second flash is detected either by an RF detector or by a photocell which can veiw the entire face of the depth sounder. The output of the zero position photodetector unambiguously detects the zero flash, with the length of time between it and the second flash establishing the depth.

In another embodiment, the intensity of the originally transmitted signal is usually higher than the intensity of the return signal and thresholding circuits are utilizied so as to establish the signal with the largest magnitude as the one indicative of the electromagnetic radiation representing the zero position.

Figure 9:
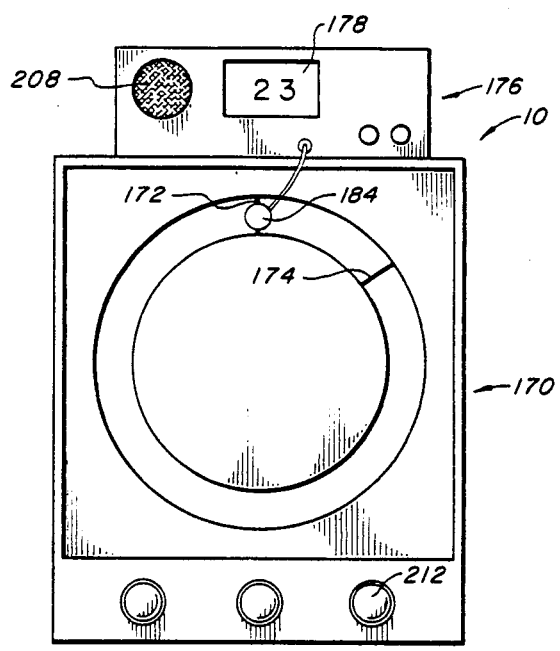
FIG. 9 is a diagrammatic representation of a depth sounder with an add-on unit which establishes depth as the time difference of radiation emitted from the depth sounder.
Figure 10:
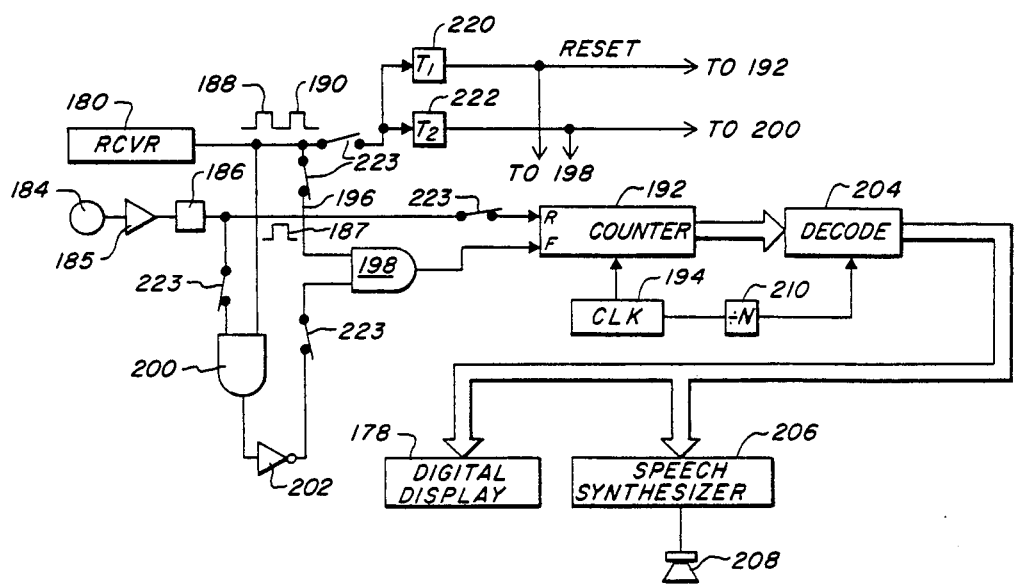
FIG. 10 is a schematic diagram of a system for use in the unit of FIG. 9 in which the time difference of radiation emitted from the depth sounder is used to establish depth for conversion into a speech equivalent.

Referring now to FIGS. 9 and 10, a flashing or analog depth sounder 170 is provided which in general provides two flashes of light 172 and 174 on its display. An add-on unit 176 provided with a digital depth indicator 178 and a receiver 180 is mounted on top of depth sounder 170. This unit provides both a digital indication of the depth subsequently decoded and its speech equivalent. A photodetector 184 coupled to an amplifier 185 and a squaring circuit 186 is placed over the zero position so as to produce a pulse 187 when a flash occurs at the zero position. Receiver 180 also produces a pulse 188 from the electromagnetic radiation associated with the zero position flash. It is a feature of receiver 180 that it produces a pulse when the depth sounder is actuated to produce a flash at any position.

A time thereafter, a pulse 190 is produced by receiver 180, with the time difference between pulses 186 and 190 being used to establish a depth equivalent. In one embodiment this is accomplished through the utilization of a counter 192 clocked by a variable rate clock 194, with counter 192 having reset and freeze inputs as illustrated. The output from squaring circuit 186 is applied to reset counter 192 in a periodic basis as described hereinbefore, whereas pulses on line 196 from receiver 180 are coupled to an AND gate 198, which is in turn coupled to the freeze input of counter 192. The outputs of squaring circuit 186 and receiver 180 are coupled to an AND gate 200, the output of which is inverted at 202 and is provided to the other input terminal of AND gate 198.

The output of counter 192 is coupled to a decode circuit 204 which is utilized to drive a speech synthesizer 206 which drives a loudspeaker 208. The output of decode unit 204 is also utilizied to drive digital display 178.

In operation, photodetector 184 produces pulse 186 which is utilized to reset counter 192. The output of this photodetector is ANDed with the output of receiver 180, with the result that the simultaneous occurrence of pulses 186 and 188 inhibit the freezing of counter 192 which would ordinarily have been frozen both by pulses 188 and 190. Thus, only pulse 190 freezes counter 192. It will be noted that an output of a variable rate clock 194 is applied to a divide-by-N circuit 210 which is utilized to read out decode unit 204 to the speech synthesizer and the digital display on a periodic basis.

It will also be appreciated that an intensity control 212 may be utilized to adjust the output of the depth sounder to produce two and only two flashes. This in and of itself provides a filter function such that the digital display and the speech synthesizer are not actuated by double bounce or triple bounce spurious signals. The utilization of the visually adjusted flash or flash actuation signal reduces spurious signal activation of the talking depth sounder by virtue of the adjustment of the intensity control to produce two and only two flashes. This solves a significant problem with respect to other types of digital depth sounders in which no such visually actuatable filter system is provided.

While the system described thus far utilizes a photodetector at the zero position to provide an unambiguous zero position signal, as illustrated at the top of FIG. 10, thresholding circuits 220 and 222 actuated by switch 233 may be utilized to distinguish the electromagnetic signal representing the zero position from the electromagnetic signal representing the return signal. These signals may be utilized as above to reset and freeze counter 192, with the signals also being provided to AND gate 200 to inhibit the freeze. Thus, the circuit at the top of this figure may be utilized to drive counter 192, decode unit 204, speech synthesizer 206, and digital display 182 in the manner described in connection with the system utilizing the photodetector at the zero position.

Figure 11:
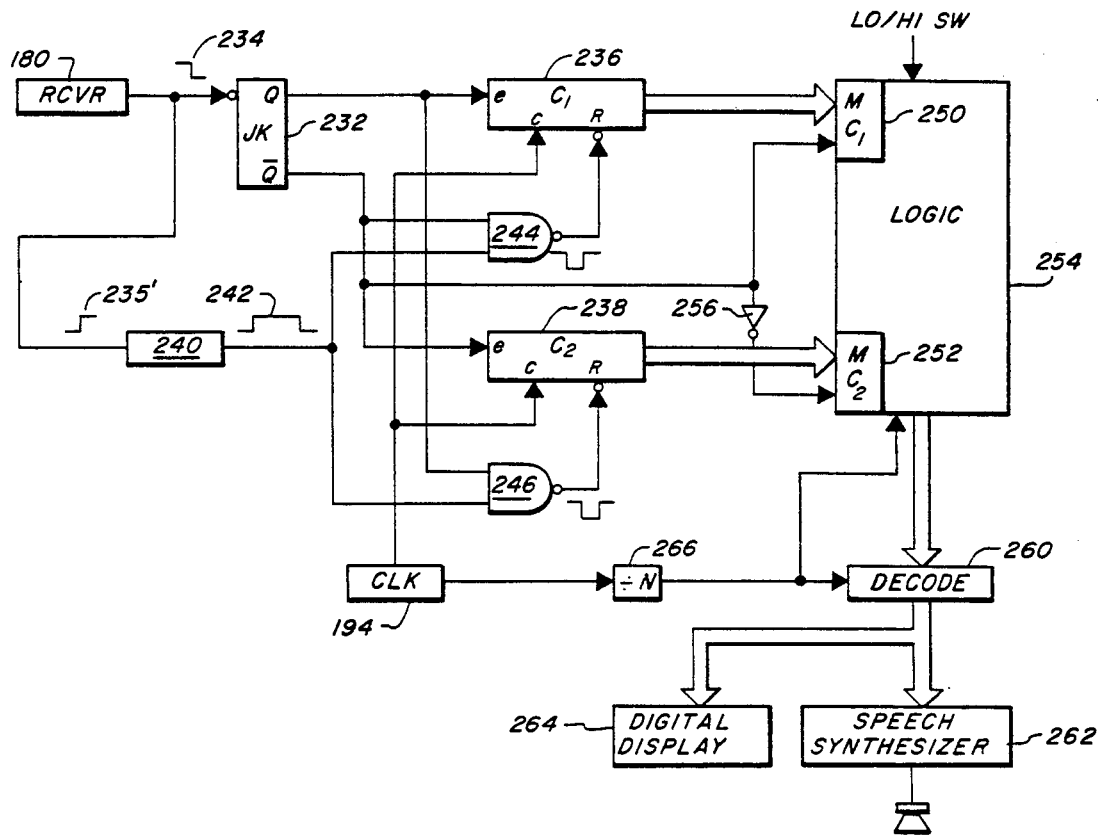
FIG. 11 is a schematic diagram of an alternative system for establishing the time difference of radiation emitted from the depth sounder of FIG. 9.

For those instances in which it is inconvenient to identify the zero flash, the system of FIG. 11 provides for determining the time differences between the flashes without identifying the zero flash pulse. This system does, however, require the user to select whether the unit is to sense flashes from 0°–180° or from 180°–360° because the system cannot distinguish between time intervals associated with the two different segments of the display. This system does not require thresholding circuits to determine which pulse corresponds to the zero position flash, but rather leaves it to the operator of the device to switch between one of two ranges.

If the user switches so as to choose the shortest of the two time intervals, this corresponds to depth as represented on the depth sounder as being between 0° and 180°. Choosing the shorter time interval therefore may correspond to a selection of between 0 and 25 feet. On the other hand, selecting the longer time difference results in a depth indication of between 25 feet and 50 feet in the foregoing example, It will thus be appreciated that the longer time interval corresponds to the time it takes for the rotary element to revolve from zero position past the 180° position to a position between 180° and 360°. The selection of range can be easily ascertained by visual inspection of the depth sounder so that the appropriate ranges selected. Again, the range of the add-on unit may be adjusted to the range of the depth sounder by virtue of a variable rate clock.

In the illustrated embodiment, in order to accumulate time differences relating to the lower scale or the higher scale, receiver 180 is coupled to a JK flip-flop 232 which triggers on the negative going portion 234 of a pulse from receiver 180. The Q output of JK flip-flop 232 is coupled to a counter 236 to enable the counter whereas the $\overline{Q}$ output of JK flip-flop 232 is coupled to counter 238 to enable this counter. A variable rate clock 194 is coupled to the clocking inputs of these counters. The output of receiver 180 is also coupled to the input of a monostable multivibrator 240 which triggers on the rising portion 235 of the pulse from receiver 180. This produces an elongated output pulse 242 which is coupled to one input of NAND gates 244 and 246. The output of NAND gate 244 is coupled to the reset terminal of counter 236, whereas the output of NAND gate 246 is coupled to the reset terminal of counter 238. The other input to NAND gate 244 is coupled to the $\overline{Q}$ output of flip-flop 232, whereas the other input to NAND gate 246 is coupled to the Q output of flip-flop 232. The outputs of counter 236 and 238 are respectively coupled to memories 250 and 252 in logic 254 which functions to select either whether the count in memory 250 is larger than the count in memory 252, or visa-versa. This choice represents the aforementioned range selection. Memory loading is accomplished via the connection to the $\overline{Q}$ output of flip-flop 232 such that the memory associated with one counter is loaded when the other counter is counting.

In operation, upon the receipt of the first pulse from receiver 180, the positive going portion resets counter 236 since at this point the $\overline{Q}$ output of flip-flop 232 is high. On the trailing edge of this first pulse, JK flip-flop changes state so as to enable counter 236. Counter 236 continues counting until it is reset by the second pulse from receiver 180 in response to the resulting pulse 242 from monostable multivibrator 240 and a change in the state of flip-flop 232 in which the $\overline{Q}$ output goes high.

When the $\overline{Q}$ output of flip-flop 232 goes high on the negative going edge of the second pulse, counter 238 is enabled, this counter having been reset on the positive going portion of the second pulse by virtue of the output of the multivibrator being delivered to NAND gate 246, along with the previous pulse-high Q output of flip-flop 232. Counter 283 continues to count until a third pulse is received from reciever 234 which changes the state of the $\bar{Q}$ output of flip-flop 232 and therefore disables the counter 238.

Counter 236 is readout to memory 250 when $\bar{Q}$ is high and counter 238 begins its count, whereas an inverted signal from the $\bar{Q}$ output via inverter 256 is utilized in the loading of memory 252 when counter 236 begins its count.

It will thus be seen that the outputs of the counters correspond respectively to two time difference intervals since during a given cycle, the counters will accumulate different counts. These counts are read into the memory of logic 254 which selects on a periodic basis the contents of memory 250 or the contents of memory 252. If the shorter time interval is desired for flashes between 0° and 180°, circuits within logic 254 determine which of the two counters has the lowest count by determining which of the two memories has the lowest count. This output is then supplied to decode unit 260 which decodes the number and supplies signals to either speech synthesizer 262 or digital readout 264. If, on the other hand, it is desired to readout the range from 180°–360°, the memory containing the larger count is read out to decode unit 260.

The comparisons and readout of logic 254 and decode unit 260 is, as described before, under the control of clock 174, the output of which is provided to a divide-by-N unit 266, having its output coupled to logic 254 and to decode unit 260. Thus at any given time selected for readout, either memory 250 or memory 252 will be readout to decode unit 260.

It will be appreciated that reciever 180 may be adapted to detect radiation at any region in the electromagnetic spectrum so as to produce output pulses corresponding to flash actuation signals or the flash itself. In so doing, the unit provided atop the depth sounder need not be directly connected to any electronic circuits of the depth sounder, but rather may include detectors which detect electromagnetic radiation available outside the case of the depth sounder.

Having above indicated a preferred embodiment of the present invention, it will occur to those skilled in the art that modifications and alternatives can be practiced within the spirit of the invention. It is accordingly intended to define the scope of the invention only as indicated in the following claims.

What is claimed is:

1. Apparatus for converting a depth sounder having a case wherein electromagnetic radiation is produced in providing a depth indication into one in which depth is periodically called out without access to the interior of said case comprising:
   means exterior to said case for sensing the electromagnetic radiation prouced by said depth sounder in providing said depth indication;
   means for converting information represented by the sensed electromagnetic radiation into a number; and,
   means for converting the number into a speech equivalent.

2. The apparatus of claim 1 wherein said depth sounder includes a display having an element which is driven to emit electromagnetic radiation, wherein said sensing means includes means for sensing pulses of electromagnetic radiation associated with driving said element, and wherein said converting means includes means for ascertaining the time difference between said sensed pulses.

3. The appartus of claim 2 wherein said element is driven once at a zero depth indication and once at a time thereafter corresponding to sensed depth and wherein said time difference ascertaining means includes means for unambiguously sensing the pulse of electromagnetic radiation associated with said zero depth indication, means for sensing the pulses of electromagnetic radiation associated with all depth indications, a counter, means for starting said counter responsive to a sensed pulse of electromagnetic radiation corresponding to said zero depth indication and means for stopping said counter responsive to a subsequently sensed pulse of electromagnetic radiation corresponding to any depth indication.

4. The apparatus of claim 3 wherein said unambiguous sensing means includes means at the zero depth indication position of said depth sounder for sensing the output of said element only at said zero position.

5. The apparatus of claim 3 wherein said unambiguous sensing means includes means for sensing all of the electromagnetic radiation associated with a depth indication, and threshold means for establishing the strongest electromagnetic radiation by producing a signal responsive to the sensed electromagnetic radiation exceeding a predetermined value.

6. The apparatus of claim 2 wherein said sensing means includes means for generating output pulses corresponding to all of said pulses of electromagnetic radiation and wherein said converting means includes means for ascertaining the time differences between successive pairs of output pulses thereby to establish two time intervals, and means for selecting either the greater or smaller time interval as that which is converted to a number by said converting means.

* * * * *